United States Patent [19]

Holdar et al.

[11] Patent Number: 5,447,638

[45] Date of Patent: Sep. 5, 1995

[54] METHOD FOR FLOCCULATING FINELY DIVIDED SOLIDS SUSPENDED IN NONPOLAR LIQUIDS

[75] Inventors: Robert M. Holdar, Irving; Michael L. Paulson, Copper Canyon, both of Tex.

[73] Assignee: NCH Corporation, Irving, Tex.

[21] Appl. No.: 122,727

[22] Filed: Sep. 16, 1993

[51] Int. Cl.$^6$ .............................................. B01D 21/01
[52] U.S. Cl. ....................... 210/728; 8/141; 208/180; 210/729; 210/735; 585/864
[58] Field of Search .................. 8/141; 208/180; 210/725, 727, 728, 729, 732, 734, 735, 736, 708; 585/864

[56] References Cited

U.S. PATENT DOCUMENTS

| | | | |
|---|---|---|---|
| 3,576,741 | 4/1971 | Redmore | 210/735 |
| 4,006,247 | 2/1977 | Panzer et al. | 210/735 |
| 4,038,176 | 7/1977 | Noren et al. | 208/180 |
| 4,184,949 | 1/1980 | Sader | 210/727 |
| 4,230,839 | 10/1980 | Buriks et al. | 526/75 |
| 4,376,040 | 3/1983 | Sader | 210/729 |
| 4,450,090 | 5/1984 | Kinney | 252/106 |
| 4,522,729 | 6/1985 | Tabler | 210/729 |
| 4,584,111 | 4/1986 | Collett et al. | 252/32.7 E |
| 4,745,154 | 5/1988 | Ruffner | 524/801 |
| 4,778,813 | 10/1988 | Fenyes et al. | 210/735 |
| 4,789,460 | 12/1988 | Tabler et al. | 210/729 |
| 5,093,008 | 3/1992 | Clifford | 210/712 |
| 5,130,358 | 7/1992 | Danner | 524/140 |
| 5,154,857 | 10/1992 | Durrieu et al. | 210/708 |
| 5,286,386 | 2/1994 | Darian et al. | 210/639 |

OTHER PUBLICATIONS

*Perry's Chemical Engineers' Handbook* 4th Ed.
"Flocculation In Solvents", prepared by NERAC, Inc., Apr. 19, 1993.

*Primary Examiner*—Peter A. Hruskoci
*Attorney, Agent, or Firm*—Ross, Clapp, Korn & Montgomery

[57] ABSTRACT

A method for flocculating finely divided particles suspended in nonpolar liquids, thereby facilitating the removal of these particles by sedimentation or filtration, by treating the contaminated nonpolar liquids with from about 0.01% to about 5% by weight of a flocculant comprising a water soluble organic compound having a cationic quaternary nitrogen or ammonium group. The flocculants useful in the method of the invention are desirably miscible or dispersible in the nonpolar liquid, and a carrier solvent or surfactant may be used to improve dispersibility of the flocculant.

18 Claims, No Drawings

METHOD FOR FLOCCULATING FINELY DIVIDED SOLIDS SUSPENDED IN NONPOLAR LIQUIDS

BACKGROUND OF THE INVENTION

1. Field of the Invention

This invention relates to a method for flocculating finely divided solids suspended in nonpolar liquids and to chemical compositions which are useful in such method.

2. Description of Related Art

The process of flocculation is widely known and used in the treatment of water and waste water. Through the use of flocculation, finely divided suspended particles are agglomerated to permit improved separation by sedimentation, filtration, or other conventional techniques. A general discussion of flocculation is found in *PERRY'S CHEMICAL ENGINEERS' HANDBOOK*, 4th. Ed., which is incorporated by reference herein. While the process of flocculation is widely known and practiced in the treatment of water and waste water, the chemicals, compounds and polymers that function well as flocculants in aqueous systems are not generally effective for use in such nonpolar solvents as liquid hydrocarbons.

Liquid hydrocarbons and other nonpolar solvents are widely used for removing oily soils and in other processes whereby they become contaminated with finely divided suspensions of soil particles, carbon particles, tar, carbonized hydrocarbons, and the like. One example of such contamination occurs in solvents used in automotive parts washers. Often a substantial portion of the contaminants are so small that they are present as a colloidal suspension and are not readily removed by settling or filtration.

Prior art flocculants and flocculating methods have previously been disclosed, for example, in U.S. Pat. Nos. 4,038,176; 4,230,839; 4,584,111; 4,745,154; 4,778,813; and 5,130,358.

U.S. Pat. No. 4,038,176 discloses and claims the use of soluble cationic polymers as flocculants for the coagulation of colloidal suspensions in oil, particularly used motor oil. The preferred polymer is an oil soluble polymer having a molecular weight of at least 10,000 which is selected from the group consisting of polymers of fatty diallyl quaternary ammonium salts and fatty acid salts of polymers of tertiary amino substituted acrylamides.

U.S. Pat. No. 4,230,839 discloses and claims polymers of quaternary ammonium adducts that are useful for clarifying water containing oil or suspended solids and especially oil-coated solids.

U.S. Pat. No. 4,584,111 relates to the use of an acrylamide polymer to aid in the removal of colloidal particles generated in the manufacture of lubricating oil additives such as zinc salts of dihydrocarbyldithiophosphoric acid and calcium phenate. More particularly, the patent discloses and claims introducing at least a flocculating amount of a water-in-oil emulsion of a water-soluble vinyl addition macromolecular polymer into a hydrocarbon oil reaction system (containing as little as 0.1% water) to flocculate insolubles and reduce haze. A preferred polymer for use in the invention is a cationic charge density polymer such as a methyl chloride quaternized copolymer of di-methyl ammonium ethyl methacrylate and acrylamide.

U.S. Pat. No. 4,745,154 discloses a water-in-oil emulsion comprising an oleophilic continuous phase and an aqueous dispersed phase containing a water soluble copolymer composition obtained by polymerizing in a water-in-oil emulsion a monomer system comprising an addition copolymerizable surfactant monomer and at least one water soluble vinyl monomer. Water soluble cationic monomers such as dimethyl amino ethyl acrylate, dimethyl amino ethyl methacrylate, dimethyl amino ethyl acrylate methyl chloride, dimethyl amino ethyl acrylate dimethyl sulfate, dimethyl amino ethyl acrylate acetate, dimethyl amino ethyl methacrylate methylchloride, dimethyl amino ethyl methacrylate dimethyl sulfate, dimethyl amino ethyl methacrylate acetate, methacrylamino-propyl trimethyl ammonium chloride, etc., are disclosed. Utility of the dimethyl amino ethyl acrylate copolymer as a flocculant is also disclosed.

U.S. Pat. No. 4,778,813 discloses and claims a method of flocculating solids from an aqueous system containing suspended or dissolved solids, the method comprising adding to the aqueous system a flocculant comprising one or more polymeric quaternary ammonium compounds in an amount sufficient to cause the flocculation of the solids.

U.S. Pat. No. 5,130,358 discloses hydrophilic cationic polymer compositions for use as flocculating agents, for flotation of minerals, or for recovery of oil waste in aqueous systems. The subject polymers preferably comprise amino or quaternary ammonium groups. The cationic monomers used in making the polymers can include any conventional anion, preferably a halide ion. Also disclosed and claimed are water miscible compositions comprising a hydrophilic cationic polymer free from anionic monomer components, an anionic surfactant containing at least one lipophilic hydrocarbon residue of at least 9 carbon atoms and at least one hydrophilic anionic group, a water-immiscible oil in which the polymer is insoluble, and a lipophilic non-ionic surfactant which is capable of functioning as a water-in-oil emulsifier. The anionic surfactant can comprise partial alkyl esters of phosphoric acid.

Nonpatent literature relating to flocculation is summarized in the report dated Apr. 19, 1993, prepared by NERAC, Inc., titled "Flocculation In Solvents."

Other prior patents disclose the use of cationic surface active agents, cationic acrylamide polymers with quaternary amine functionality, and imidazolines in different applications.

U.S. Pat. No. 4,576,743 discloses a lithographic plate cleaner comprising cationic surface active agents such as alkyl-dimethylbenzylammonium chloride or amphoteric surface active agents such as an alkylimidazoline in combination with a nitrate, sulfate, phosphate, or the like, and a wetting agent such as a glycol. The cationic surface active agent is used in an amount ranging from 0.01 to 10% by weight of the plate cleaner.

U.S. Pat. No. 4,783,513 discloses and claims water soluble cationic acrylamide polymers having relatively uniform cationic quaternary amine functionality.

U.S. Pat. No. 4,865,614 discloses the use of quaternary 2-alkyl-2-imidazolinium salts for softening fabrics. Preferred solvents for use in preparing the imidazolines include mixtures of water and short chain alcohols.

Notwithstanding the compositions and methods disclosed in the prior art, a method for flocculating fine, solid particles in nonpolar solvents is therefore needed.

SUMMARY OF THE INVENTION

The present invention relates to a method for flocculating finely divided particles suspended in nonpolar liquids, thereby facilitating the removal of these particles by sedimentation or filtration.

According to a preferred embodiment of the invention, contaminated nonpolar solvents are treated with from about 0.01% to about 5% by weight of a flocculant comprising a water soluble organic compound having a positively charged quaternary nitrogen or ammonium group. The flocculants useful in the method of the invention are desirably miscible or dispersible in the nonpolar solvent, and a carrier solvent or surfactant may be used to improve dispersibility of the flocculant. According to a particularly preferred embodiment of the invention, the contaminated nonpolar solvents are treated with from about 0.05% to about 2% of the specified flocculant on a weight/weight basis neglecting the weight of any water present with the flocculant and the weight of any other carrier solvent or surfactant.

DESCRIPTION OF THE PREFERRED EMBODIMENTS

Applicants have discovered that finely divided solids suspended in nonpolar liquids can be effectively flocculated by mixing the contaminated nonpolar liquids with compositions comprising a water soluble organic compound having a cationic quaternary nitrogen or ammonium group. The method of the invention is believed to be useful in flocculating suspended contaminants from nonpolar liquids such as, for example, aliphatics, aromatics, terpenes, substantially non-polar esters, substantially non-polar ketones, higher molecular weight oils, and blends thereof.

Preferred flocculants for use in the method of the invention are selected from the following groups:

Group I. Compounds containing the cationic amine functional group represented by the following formula:

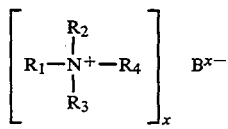

wherein $R_1$, $R_2$, $R_3$ and $R_4$ [can be independently] are each selected from the group consisting of H, $CH_3$, $C_2$-$C_{20}$ alkyl or alkenyl, benzyl, alkylbenzyl, naphthylmethyl or polyalkoxyalkyl radicals, [and] wherein $B^{x-}$ [can be] is selected from the group of anions consisting of Cl, Br, acetate, alkylsulfate, alkoxysulfate, sulfate, nitrite or phosphate, and wherein x is an positive integer.

Group II. Phosphate esters in which the ester groups contain the quaternary ammonium functionality of Group I.

Group III. Water soluble polymers bearing the quaternary ammonium functional group.

Group IV. Lanolin quaternaines.

Group V. Alkylimidazolines.

The compounds of Group I are particularly preferred for use in the method of the invention. Cationic amine compounds having alkyl substituents with chain lengths from about $C_8$ to about $C_{22}$ are particularly desirable. Alkylimidazolines are the least preferred of the cationic quaternary compounds preferred for use in the subject method.

Depending upon the selected flocculant, the nonpolar liquid being treated and the particular application, the flocculant may be introduced directly into the contaminated liquid, or as an aqueous solution, or in a suitable carrier solvent or surfactant system in order to aid dispersion. Generally, it has been found that dissolving the preferred flocculants in a suitable carrier promotes their effectiveness when used in the method of the invention. Preferred carrier solvents desirably have good solubility in water and in the nonpolar solvent to be treated. Examples of satisfactory carriers are glycol ethers, short chain alcohols and short chain esters. A particularly preferred carrier solvent for use in the present invention is isopropyl alcohol. Preferred surfactants for use as dispersants in the method of the invention include ethoxylated alcohols, ethoxylated alkyl phenols and low HLB nonionic surfactants. Where a surfactant is used instead of a carrier solvent, a lesser amount of surfactant may be required. Thus, for example, one might employ a cationic amine dispersed in a surfactant at a ratio of about 2 parts amine to 1 part surfactant, whereas the same amine might be employed with a carrier solvent such as an alcohol at a ratio of about 1 part amine to 2 parts alcohol. Group I compounds are preferably used in the method of the invention as 50% solutions in water or as 80% solutions in alcohol. At the same active concentration of flocculant, 50% solutions in water may function better in the subject method than 80% solutions in alcohol, possibly because the water adds charge to the total system.

According to the method of the invention, the flocculant compositions identified above are effective when mixed in amounts ranging from about 0.01% to about 5% by weight of the contaminated solvent, neglecting water or other carrier solvents. Preferred application rates for most compositions and uses within the scope of the subject method range from about 0.05% to about 2% weight/weight, neglecting water or other carrier solvents. Although the use of flocculating agents in lower amounts (as low as 10 ppm) may produce beneficial results in some circumstances, amounts lower than about 0.01% may not produce adequate flocculation. Conversely, particularly where the flocculant is used in combination with a carrier liquid or surfactant, flocculant amounts higher than about 5% may cause the flocculant to act as a dispersant due to excessive dilution of the contaminated nonpolar liquid. These considerations are further discussed in greater detail in *INTRODUCTION TO COLLOID AND SURFACE CHEMISTRY* (3rd Ed.), pp. 211-212, which is incorporated by reference herein.

If a carrier solvent or surfactant is to be used to promote dispersion of the cationic quaternary compound in the contaminated solvent, the flocculant is desirably preblended with the carrier or surfactant prior to adding the flocculant to the contaminated solvent. The flocculant is then preferably added to the contaminated solvent in such manner that intimate mixing can occur. One satisfactory method for mixing a flocculant solution with a contaminated solvent is with a pump. Thus, for example, flocculant solution can be slowly introduced through an injection port or into a flow line as the contaminated solvent or other nonpolar liquid is pumped or circulated past the injection point.

Particular uses and advantages achieved through use of the invention disclosed herein include, for example, prolonged service life for nonpolar liquids such as the nonpolar solvents used in parts washers; pretreatment of solvents prior to distillation during recycling; purification of virgin solvents; and the on-site clean up contaminated solvents to avoid transporting them to and from recycling facilities, thereby reducing the associated costs and eliminating the risks of transport.

The method of the invention and the utility of compositions preferred for use in the subject method are further described and explained in relation to the following examples.

EXAMPLE 1

Fifty grams of an aliphatic hydrocarbon solvent contaminated with used motor oil, carbon black and clay was treated with 0.12% of an alkyl ($C_{12}$-$C_{16}$) dimethyl benzyl ammonium chloride in water solution (45%) and allowed to stand overnight. The treated material was then clear and light amber in color. Untreated dirty solvent remained black and semi-opaque.

EXAMPLE 2

Fifty grams of the dirty solvent of Example 1 was treated with 0.12% of tris (alkylamidopropyldimethylhydroxyammonium chloride) phosphate as in Example 1. Again a clear amber solution was obtained.

EXAMPLE 3

Fifty grams of the dirty solvent of Example 1 was treated with 0.12% of coco imidazoline amphoteric dicarboxylate sodium salt. A loose amber colored floc was obtained.

EXAMPLE 4

Fifty grams of the dirty solvent of Example 1 was treated with 0.12% of vinylpyrrolidone/dimethylaminoethyl methacrylate copolymer 20% in water. A clear, dark amber solution was obtained.

EXAMPLE 5

Fifty grams of the dirty solvent of Example 1 was treated with 0.12% of Quaternium 60, a quaternary lanolin derivative. A clear amber solution was obtained.

EXAMPLE 6

Fifty grams of the dirty solvent of Example 1 was treated with 0.12% of myristyl dimethyl benzyl ammonium chloride (100% active). A clear amber solution was obtained.

EXAMPLE 7

Fifty grams of the dirty solvent of Example 1 was treated with 6.0% of a solution of myristyl dimethyl benzyl ammonium chloride (33% in isopropanol). A clear amber solution was obtained.

EXAMPLE 8

If a solvent were contaminated with a variety of soils as might be found in an automotive repair shop, it is reasonable to expect that different flocculating agents might be more effective on each of the soils and thus a blend of flocculating agents might show some synergy or increased effectiveness compared to a single component composition. To test this possibility a blend of terpenes and aliphatic solvents was used as a parts washer solvent in an automotive repair shop to clean various automotive parts. After large particles were allowed to settle the remaining solvent was sampled and fifty gram portions were treated with (a) 0.12% of alkyl ($C_{12}$-$C_{16}$) dimethyl benzyl ammonium chloride (50% in water)
(b) 0.12% of dioctyl dimethyl ammonium chloride (50% in water) and
(c) 0.12% of a 1:1 blend of (a) and (b).

After the treated samples were allowed to stand overnight, their clarity was determined by UV absorbance at 452 nm and compared to the untreated solvent. The results show a clear synergy.

TABLE I

| SAMPLE | ABSORBANCE |
| --- | --- |
| untreated | 1.606 |
| sample (a) | 1.106 |
| sample (b) | 1.106 |
| sample (c) | 0.667 |

The effective compositions are marginally soluble or dispersible in non-polar solvents. Carrier solvents or surfactants can be used to aid in their dispersion.

EXAMPLE 9

Fifty grams of the dirty solvent of Example 1 was treated with 0.18% of a blend of an alkyl ($C_{12}$-$C_{18}$) dimethyl benzyl ammonium chloride in water solution with $C_{9-12}$ alcohol ethoxylates (3–6 moles EO). A clear amber solution was obtained.

EXAMPLE 10

Fifty grams of a blend of orange terpenes and aliphatic hydrocarbons used to clean automotive parts were treated with 0.18% of a 1:1:2 blend of alkyldimethylbenzylammonium chloride, water and dipropylene glycol monomethyl ether. A clear reddish solution was obtained after settling overnight.

EXAMPLE 11

Fifty grams of the used solvent of example ten were treated with 5% of a 1:2 blend of alkyl dimethylbenzyl ammonium chloride, water and isopropyl alcohol. A clear reddish solution was obtained with several milliters of a second phase on the bottom and a substantial amount of particulate soil at the interface. The presence of such a second phase would complicate disposal of the soil.

EXAMPLE 12

Three hundred grams of the used solvent of example 10 were treated with 0.01% of the composition of example 10 and allowed to settle overnight. Some settling and clearing was observed compared to the untreated used solvent but the clarity was not as great as the sample in Example 10 even after several weeks.

EXAMPLE 13

Approximately 20 gallons of a blend of orange terpenes and aliphatic hydrocarbons was used for degreasing automotive parts for two weeks. At this time the solvent was heavily soiled and had an opaque brown appearance when placed in a 4 oz. clear glass bottle. Four ounces of the composition of example 10 above was added at 4:30 p.m. and circulated for ten minutes. The solvent was then allowed to stand quiescent overnight. At 8:00 a.m. the following morning the solvent was clear with a yellow tint and had no apparent soils or visible particulates in the supernatant.

EXAMPLE 14

Fifty grams of Aromatic 150, a solvent consisting largely of C9+ aromatic compounds, was soiled and treated as in Example 1. A light amber solution was obtained. The untreated dirty solvent remained black.

EXAMPLE 15

Fifty grams of isobutyl isobutyrate was soiled and treated as in Example 1. A clear amber solution was obtained.

EXAMPLE 16

Three fifty gram samples of a blend of 45% aliphatic solvent with 55% of a mixture of dichloromethane and 1,1,1-trichloroethane were soiled and treated as in Example 1 overnight. No improvement was noted in any of these samples. This solvent is more polar than the previous examples.

EXAMPLE 17

Fifty grams of methyl ethyl ketone was soiled and treated as in Example 1. Both treated and untreated samples were clear light amber.

EXAMPLE 18

Fifty grams of methyl amyl ketone was soiled and treated as in Example 1. The treated sample was clear light yellow in color. The untreated sample was clear amber in color.

The solvents in Examples 17 and 18 did not suspend the colloidal particles in the test soil. These solvents are significantly more polar than the solvents in Examples 1–16.

Since these flocculating agents were effective in treating light hydrocarbons a reasonable person might expect them to also be effective in higher molecular weight hydrocarbons. Such hydrocarbons are widely used as the major component of motor oils. Recyclers of such oils must remove particulate soils from the used oils prior to its reuse. In addition, if the oil is redistilled, such soils can contribute to caking and clogging of the distillation apparatus.

EXAMPLE 19

Fifty grams of used motor oil was treated with 2.0% of an alkyl ($C_{12}$-$C_{16}$) dimethyl benzyl ammonium chloride. The treated sample and an untreated sample were placed in a 110° C. oven to lower the oil viscosity and then allowed to settle overnight. Both samples remained very dark, however, the treated sample was lighter in color and contained a thick sediment. No such sediment was found in the untreated material.

Other alterations and modifications of the invention will likewise become apparent to those of ordinary skill in the art upon reading the present disclosure, and it is intended that the scope of the invention disclosed herein be limited only by the broadest interpretation of the appended claims to which the inventors are legally entitled.

We claim:

1. A method for flocculating finely divided particles suspended in a contaminated nonpolar solvent, the method comprising treating the nonpolar solvent with from about 0.01% to about 5% by weight of a flocculant selected from the group consisting of compounds containing the cationic quaternary amine functional group represented by the following formula:

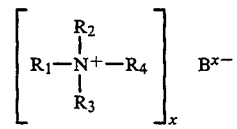

wherein $R_1$, $R_2$, $R_3$, $R_4$ are each selected from the group consisting of H, $CH_3$, $C_2$-$C_{20}$ alkyl or alkenyl, benzyl, alkylbenzyl, or naphthylmethyl radicals, wherein $B^{x-}$ is selected from the group of anions consisting of Cl, Br, acetate, alkylsulfate, alkoxysulfate, sulfate, nitrite or phosphate, and wherein x is an positive integer.

2. The method of claim 1 wherein the nonpolar solvent is treated with from about 0.05% to about 2% by weight of the flocculant.

3. The method of claim 1 wherein the nonpolar solvent is selected from the group consisting of aliphatics, aromatics, terpenes, substantially nonpolar esters, substantially nonpolar ketones, and blends thereof.

4. The method of claim 1 wherein the flocculant is miscible in the nonpolar solvent.

5. The method of claim 1 wherein the flocculant is dispersible in the nonpolar solvent.

6. The method of claim 1 wherein the flocculant is preblended with a surfactant prior to treating the nonpolar solvent.

7. The method of claim 6 wherein the surfactant is selected from the group consisting of ethoxylated alcohols, ethoxylated alkyl phenols and low HLB nonionic surfactants.

8. The method of claim 6 wherein the ratio of flocculant to surfactant is about 2:1 by weight.

9. A method for flocculating finely divided particles suspended in a contaminated nonpolar solvent, the method comprising treating the nonpolar solvent with from about 0.01% to about 5% by weight of a flocculant selected from the group consisting of phosphate esters in which the ester groups contain the cationic quaternary amine functional group represented by the following formula:

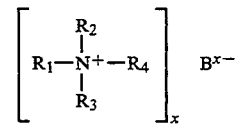

wherein $R_1$, $R_2$, $R_3$ and $R_4$ are each selected from the group consisting of H, $CH_3$, $C_2$-$C_{20}$ alkyl or alkenyl, benzyl, alkylbenzyl, naphthylmethyl or polyalkoxyalky radicals, wherein $B^{x-}$ is selected from the group of anions consisting of Cl, Br, acetate, alkylsulfate, alkoxysulfate, sulfate, nitrate or phosphate, and wherein x is an positive integer.

10. A method for flocculating finely divided particles suspended in a contaminated nonpolar solvent, the method comprising treating the nonpolar solvent with from about 0.01% to about 5% by weight of a flocculant selected from the group consisting of lanolin quaternaries.

11. A method for flocculating finely divided particles suspended in a contaminated nonpolar solvent, the method comprising treating the nonpolar solvent with from about 0.01% to about 5% by weight of a flocculant selected from the group consisting of alkylimidazolines.

12. The method of claim 9, 10 or 11 wherein the nonpolar solvent is treated with from about 0.05% to about 2% by weight of the flocculant.

13. The method of claim 9, 10 or 11 wherein the nonpolar solvent is selected from the group consisting of aliphatics, aromatics, terpenes, substantially nonpolar esters, substantially nonpolar ketones, and blends thereof.

14. The method of claim 9, 10 or 11 wherein the fiocculant is miscible in the nonpolar solvent.

15. The method of claim 9, 10 or 11 wherein the flocculant is dispersible in the nonpolar solvent.

16. The method of claim 9, 10 or 11 wherein the fiocculant is preblended with a surfactant prior to treating the nonpolar solvent.

17. The method of claim 16 wherein the surfactant is selected from the group consisting of ethoxylated alcohols, ethoxylated alkyl phenols and low HLB nonionic surfactants.

18. The method of claim 16 wherein the ratio of fiocculant to surfactant is about 2:1 by weight.

* * * * *

UNITED STATES PATENT AND TRADEMARK OFFICE
CERTIFICATE OF CORRECTION

PATENT NO. : 5,447,638
DATED : SEPTEMBER 5, 1995
INVENTOR(S) : ROBERT M. HOLDAR ET AL.

It is certified that error appears in the above-identified patent and that said Letters Patent is hereby corrected as shown below:

Column 3, line 60:
  Delete "beating", insert --bearing--

Column 3, line 62:
  Delete "quaternaines", insert --quaternaries--

Signed and Sealed this

Thirtieth Day of April, 1996

Attest:

BRUCE LEHMAN

Attesting Officer    Commissioner of Patents and Trademarks

UNITED STATES PATENT AND TRADEMARK OFFICE
CERTIFICATE OF CORRECTION

PATENT NO.   : 5,447,638
DATED        : September 5, 1995
INVENTOR(S)  : Robert M. Holdar, et al.

It is certified that error appears in the above-identified patent and that said Letters Patent is hereby corrected as shown below:

Col. 8, Line 67, delete "alkylirnidazolines" and insert --alkylimidazolines-- in place thereof.

Signed and Sealed this

Twenty-second Day of December, 1998

Attest:

BRUCE LEHMAN

Attesting Officer    Commissioner of Patents and Trademarks